United States Patent [19]
Hansen

[11] Patent Number: 5,778,827
[45] Date of Patent: Jul. 14, 1998

[54] COW LIFT MECHANISM

[76] Inventor: Mark O. Hansen, Maverick Veterinary Services. 29429 SR 2. Monroe. Wash. 98272

[21] Appl. No.: 822,492

[22] Filed: Mar. 24, 1997

[51] Int. Cl.$^6$ ............................................. A61D 3/00
[52] U.S. Cl. ............................................. 119/728
[58] Field of Search .......................... 119/725, 728

[56] References Cited

U.S. PATENT DOCUMENTS

| | | |
|---|---|---|
| 1,366,178 | 1/1921 | Hatch . |
| 2,743,701 | 5/1956 | Boyd ............................. 119/728 |
| 3,807,361 | 4/1974 | Kaplan . |
| 3,827,406 | 8/1974 | Berns ............................. 119/728 |
| 4,318,365 | 3/1982 | Eriksson . |
| 4,432,306 | 2/1984 | Rossa ............................. 119/725 |
| 4,489,677 | 12/1984 | Handley . |
| 4,550,686 | 11/1985 | Munks . |
| 4,767,099 | 8/1988 | Munks . |
| 4,831,967 | 5/1989 | Anderson . |

FOREIGN PATENT DOCUMENTS 819829  9/1959  United Kingdom ............ 119/728

*Primary Examiner*—Robert P. Swiatek
*Attorney, Agent, or Firm*—Richard C. Litman

[57] ABSTRACT

An animal lifting mechanism for lifting the rear quarters of a lying cow or the like animal. An angle adjustable yoke has cushioned gripping arms disposed angularly inward. The yoke's included angle is adjusted by a pivoting crank with a hook attached to one of the arms of the yoke. The other yoke arm anchors a chain for engagement with the hook for the adjustment of the yoke angle which is dependent on the size of the animal. The apex of the angled yoke has a rotatable ring which is adapted to be attached to a lifting chain.

10 Claims, 3 Drawing Sheets

5,778,827

1

COW LIFT MECHANISM

BACKGROUND OF THE INVENTION

1. Field of the Invention

The present invention relates to an animal lifting mechanism for raising an animal by its innominate bones in even the limited space available in a stall. In particular, the mechanism is useful in raising a cow unable to stand for various reasons.

2. Description of Related Art

The related art shows animal lifting mechanisms with an emphasis on large slings. However, they do not offer a smaller but effective lifting mechanism with an adjustable yoke which can be utilized even in a limited space such as the animal's stall for lifting only the hind quarters of the lying animal. The related art will be discussed in the order of their perceived relevance to the present invention.

U.S. Pat. No. 4,318,365 issued on Mar. 9, 1982, to KjellIvan Eriksson describes a rigid yoked device for lifting animals. The rigid yoke has two movable gripping members on straight arms. The gripping members are brought closer together by means of first and second hinges spaced from each other. A crank handle moves only one of the straight arms to narrow the space between the gripping members to grip the hip bone projections of the animal. The reference is distinguished by the straight arms and the restricted movement of only one straight arm.

U.S. Pat. No. 4,432,306 issued on Feb. 21, 1984, to Dennis J. Rossa describes a portable dismantling humane cow lift comprising a frame on four legs with two winches for a sling to lift the front portion of the cow and a hip clamp on a hoist. The hip clamp consists of two angled arms (inverted L-shaped) joined at a pivot loop for hoisting and ending in bare stirrup-shaped loops which engage the pelvic bones. Padding for the loops is not suggested. A threaded crank rod is positioned across both arms at a midpoint of the lower straight portions. The free end of the crank rod is threaded through a fixed nut on one arm. The handle end of the crank rod has bearing or spacer tubes on either side of the pivoting guide tube on the other arm. Rossa is distinguished by the use of a crank rod traversing both arms, whereas the present invention utilizes a simpler yet effective method of connecting the arms with a chain on a hook of the non-pivoting crank rod.

U.S. Pat. No. 1,366,178 issued on Jan. 18, 1921, to Orin E. Hatch and U.S. Pat. No. 3,807,361 issued on Apr. 30, 1974, to Norman C. Kaplan describe portable animal elevating apparatus comprising a frame within which the animal is strapped in a body harness and lifted to a standing position. There are no suggestions for utilizing a small yoked hip hoist in either patent.

U.S. Pat. Nos. 4,489,677 issued on Dec. 25, 1984, to John E. Handley; 4,550,686 issued on Nov. 5, 1985, to R. Leonard Munks; 4,767,099 issued on Aug. 30, 1988, to R. Leonard Munks; and 4,831,967 issued on May 23, 1989, to Charles D. Anderson describe animal support slings with and without a description of a hoist system. There are no suggestions for a yoked hip lift in any of these patents.

None of the above inventions and patents, taken either singularly or in combination, is seen to describe the instant invention as claimed. Thus, a cow lift mechanism solving the aforementioned problems is desired.

SUMMARY OF THE INVENTION

The present invention is directed to an animal lifting mechanism for lifting the rear quarters of a lying cow or the like animal. The animal lifting mechanism has an angle adjustable yoke with cushioned gripping arms disposed angularly inward. The yoke's included angle is adjusted by a crank with a hook attached to one of the arms of the yoke. The other yoke arm anchors a chain for engagement with the hook for the adjustment of the yoke angle which is dependent on the size of the animal. The apex of the angled yoke has a rotatable ring which is adapted to be attached to a lifting chain.

Accordingly, it is a principal object of the present invention to provide a cowlift which is effective and not harmful to the cow.

It is another object of the invention to provide a cowlift which is small in size and light-in weight.

It is a further object of the invention to provide a cowlift which is simple to adjust to the cow's dimensions.

Still another object of the invention is to provide a cowlift which is adaptable to attach readily to a lying cow in cramped quarters.

It is an object of the invention to provide improved elements and arrangements thereof in a cow lift mechanism for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention provides a portable animal lift directed preferably to dairy cattle or a cow which must be lifted from a lying position in an area with limited space such as a stall. A "downer cow" syndrome is due to multiple causes, but most commonly caused by nerve damage to the hind limbs as a result of a difficult calving. The essence of the present invention is that the animal lift is only as wide as the cow. This feature is vital in narrow alleyways or sleeping stalls. The animal lift is a humane way to move disabled cows and a necessity as a physical therapy tool to reposition cows side to side and to elevate the hind end for milking to prevent further illness from udder diseases. A critical feature of the present invention is that the enclosing or gripping angles of the device apply pressure on the innominate bones of the cow to maximize the effectiveness of the hip lifting device without causing pain and/or injury to the cow.

Figure 1:
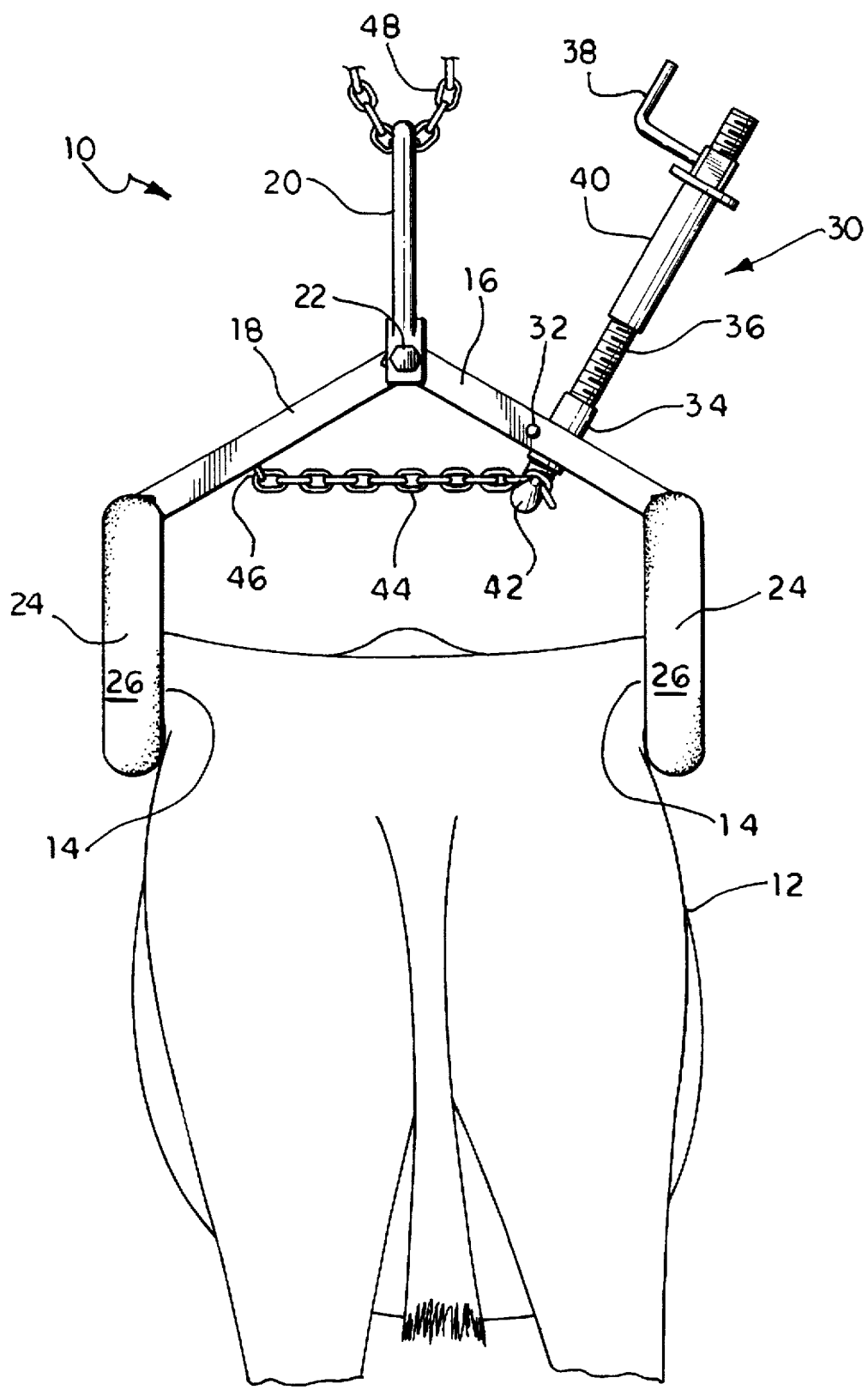
FIG. 1 is an environmental, perspective rear view of a cow being lifted by the innominate bones by the lift mechanism shown in a front view according to the present invention.
Figure 2:
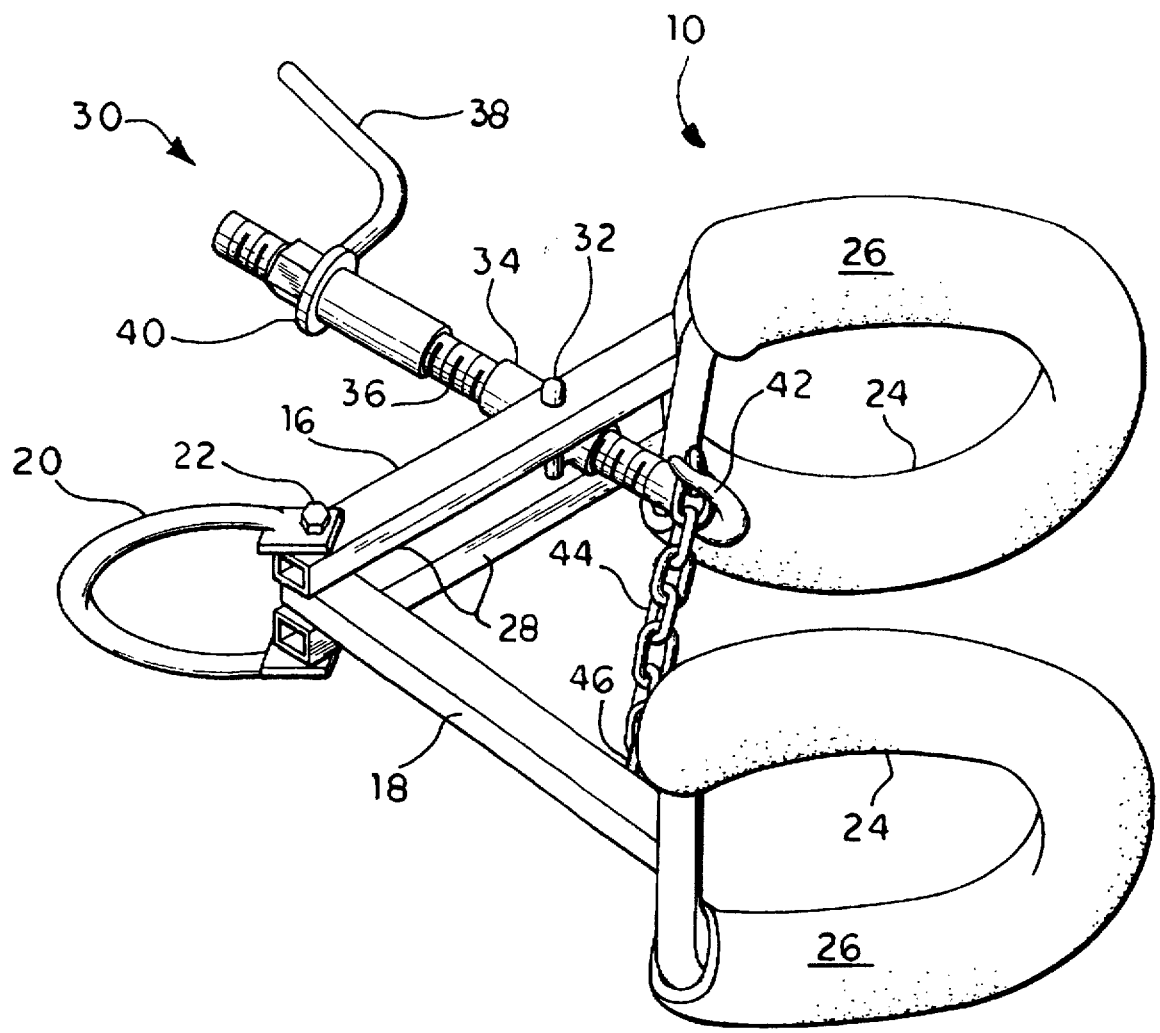
FIG. 2 is a perspective view of the lift mechanism from the left side.
Figure 3:
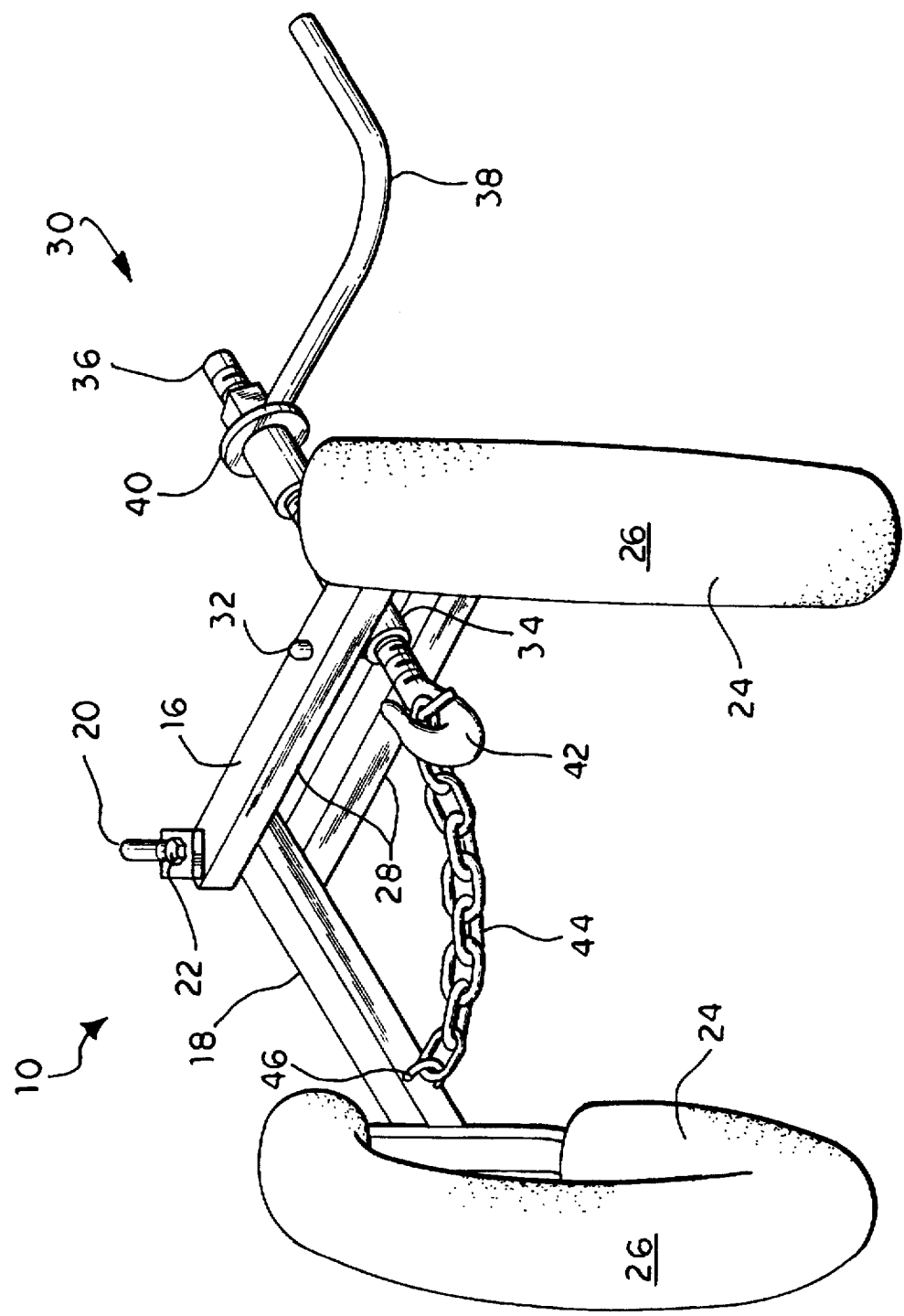
FIG. 3 is a perspective view of the lift mechanism from the bottom.

In FIG. 1, the cow lifting device 10 is shown attached to the cow 12 after successfully lifting the cow by its normally protruding hip or innominate bones shown as protrusions 14. The device 10 has two straight arms, first arm 16 and second arm 18, which are not identical in structure. These arms are pinned at their upper or first ends by a stirrup-shaped ring 20 having a rod portion 22, e.g., bolt and nut, which acts as the pivoting pin. The lower or second ends of the arms 16 and 18 are each connected to a padded circular arm 24 which is inclined inwardly at a predetermined angle. The padded circular arms 24 are planar. The resilient padding 26 can be foamed plastic, rubber or the like.

The first arm 16 has two parallel elements 28 with a crank 30 positioned between the elements 28 by a pivot pin or bolt 32 affixed on a threaded casing 34. The pin or bolt 32 allows the crank 30 to pivot to any angle which would permit the cow lifting device 10 to optimally fit the animal prior to tightening the crank 30. A threaded crank-shaft 36 passes through the threaded casing 34. A crank handle 38 is threaded into a flanged body 40 to contact the crankshaft 36 to secure the handle with the crankshaft. A hook 42 is provided at the opposite end of the crankshaft 36. A chain 44 is attached to the second arm 18 by a ring 46. A link of the chain 44 is then attached to the hook 42, and the crankshaft 36 is moved out from the first arm 16 to draw the chain taut. The crankshaft 36 and the chain 42 thus control the included angle between the first and second arms 16 and 18 of the cow lifting device 10. The included angle depends on the size of the animal being lifted.

When the device 10 is arranged to fit the innominate bones or hip protrusions 14 of the lying cow 12, and the lifting chain 48 is attached to the stirrup-shaped ring 20, any heavy equipment such as a fork lift tractor can now lift the cow 12. An overhead pulley system can also be employed with the heavy equipment.

Exemplary dimensions of the present invention are as follows:

Weight of the cow lifting device 10: Approximately 15 lbs.

Lengths of straight arms 16 and 18: 9.5 to 12 in.; 11 in. preferred for 1 in. square steel tubing.

Internal diameter of circular arms: 9 in. for 1 in. square steel tubing.

Angle of crankshaft 36 on arm 16 with respect to the ring 20: A variable angle accommodated by the pivot pin or bolt 32 and dependent on the alignment of a straight chain from the hook 42 to the ring 46.

Angle included between arms 16 and 18: 90° to 125°; 115° preferred.

It is to be understood that the present invention is not limited to the embodiment described above, but encompasses any and all embodiments within the scope of the following claims.

I claim:

1. A cow lift mechanism in the form of an adjustable yoke, said yoke comprising:

a first arm with a first end;

a second arm, said second arm having a first end;

a stirrup-shaped ring, said first end of said first arm pivoting with said first end of said second arm on said stirrup-shaped ring;

said first arm having two parallel elements and a pivotal crank having a hook, and positioned between the parallel elements;

a first end of said second arm pivoting at the ring between the two parallel elements of the first arm and a second end having a length of angle adjusting chain connected thereto;

each said first arm and said second arm attached to a padded circular arm at a predetermined angle, in that the padded arms are inclined toward each other; and a length of hoisting chain connected to said stirrup-shaped ring;

whereby said padded circular arms upon being placed against the innominate bones of the lying cow, the angle adjusting chain being attached to the hook, the crank being rotated out to tighten the angle adjusting chain, and the hoisting chain being pulled upwards to lift the lying cow by the padded arms on the innominate bones.

2. The cow lift mechanism according to claim 1, wherein the crank consists of a threaded crankshaft with a crank handle on an outside end of the crankshaft, said crankshaft traversing a threaded throughbore casing affixed to the first arm and having the hook at an inside end of the crankshaft.

3. The cow lift mechanism according to claim 2, wherein the crankshaft and handle are oriented on the first arm at a variable angle accommodated by a pivot pin.

4. The cow lift mechanism according to claim 1, wherein the predetermined angle is within the range from 90° to 125°.

5. The cow lift mechanism according to claim 4, wherein the predetermined angle is approximately 115°.

6. The cow lift mechanism according to claim 11 wherein the first and second arms and the circular arms which are surrounded with padding comprise rectangular metal tubes.

7. The cow lift mechanism according to claim 1, wherein the circular arms are solid round bars surrounded by padding.

8. The cow lift mechanism according to claim 1, wherein the first and second arms are straight.

9. The cow lift mechanism according to claim 1, wherein the padded circular arms are planar.

10. The cow lift mechanism according to claim 1, wherein the padding of the padded circular arms is resilient material selected from the group consisting of foamed plastic and rubber.

* * * * *